(No Model.)　　　　　　　　　　　C. SHIRLEY.　　　　　　　8 Sheets—Sheet 4.
THRASHING MACHINE.
No. 299,862.　　　　　　　　　　Patented June 3, 1884.
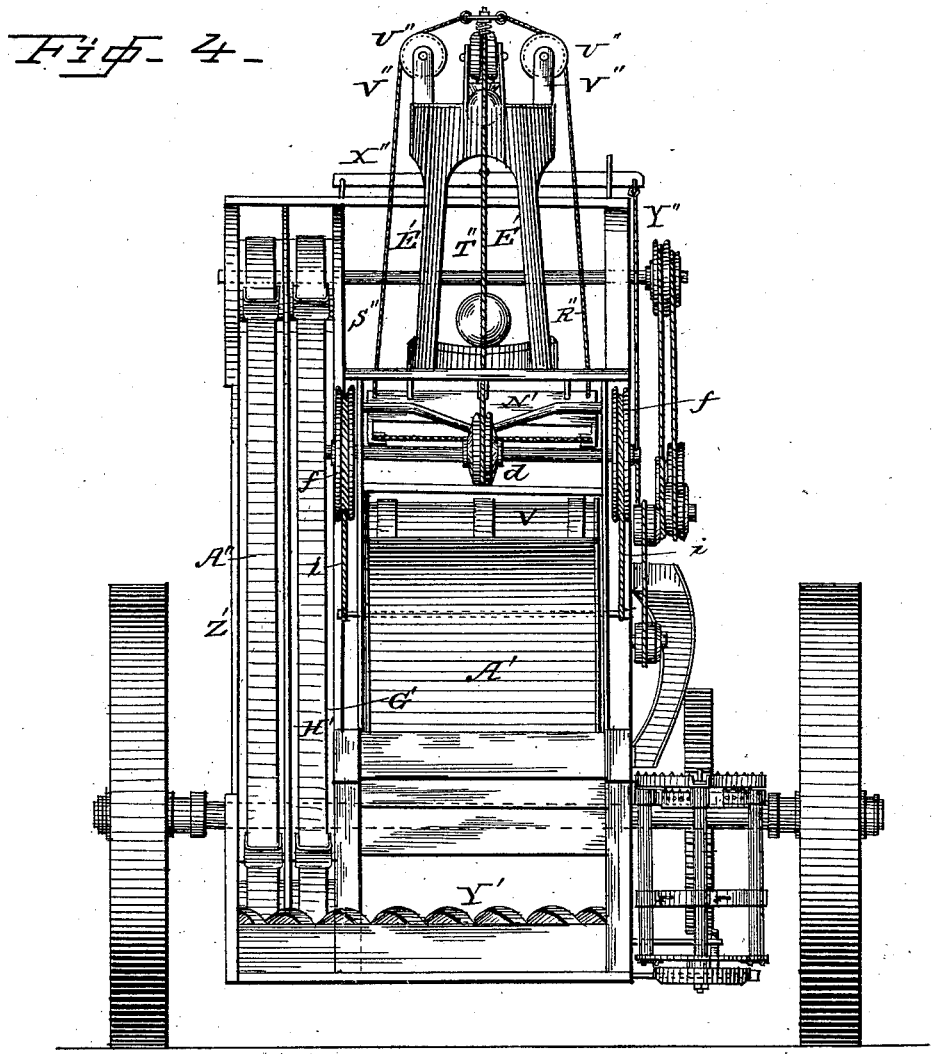
WITNESSES:
INVENTOR.
Charles Shirley
By Louis Bagger & Co,
ATTORNEYS.

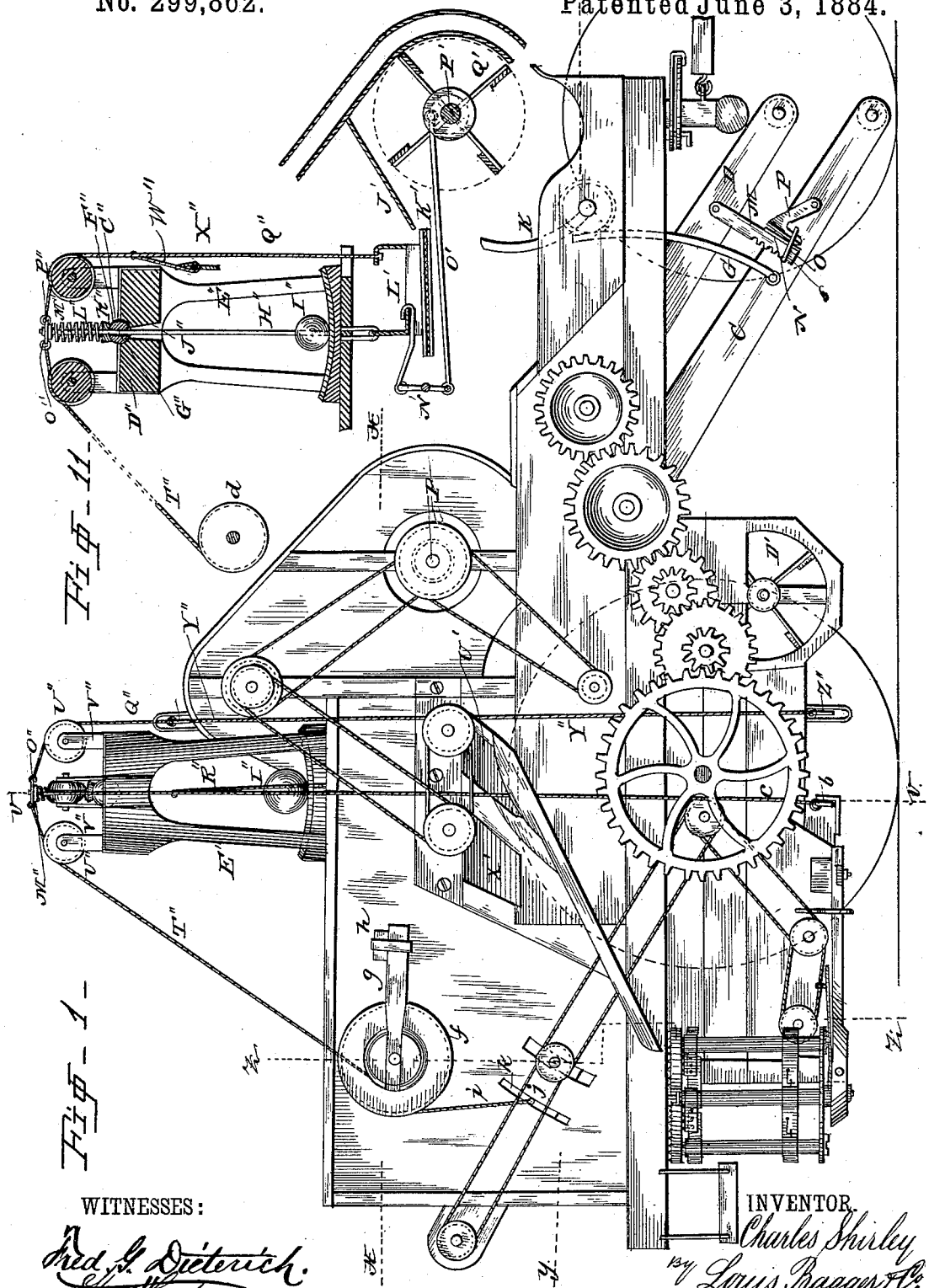

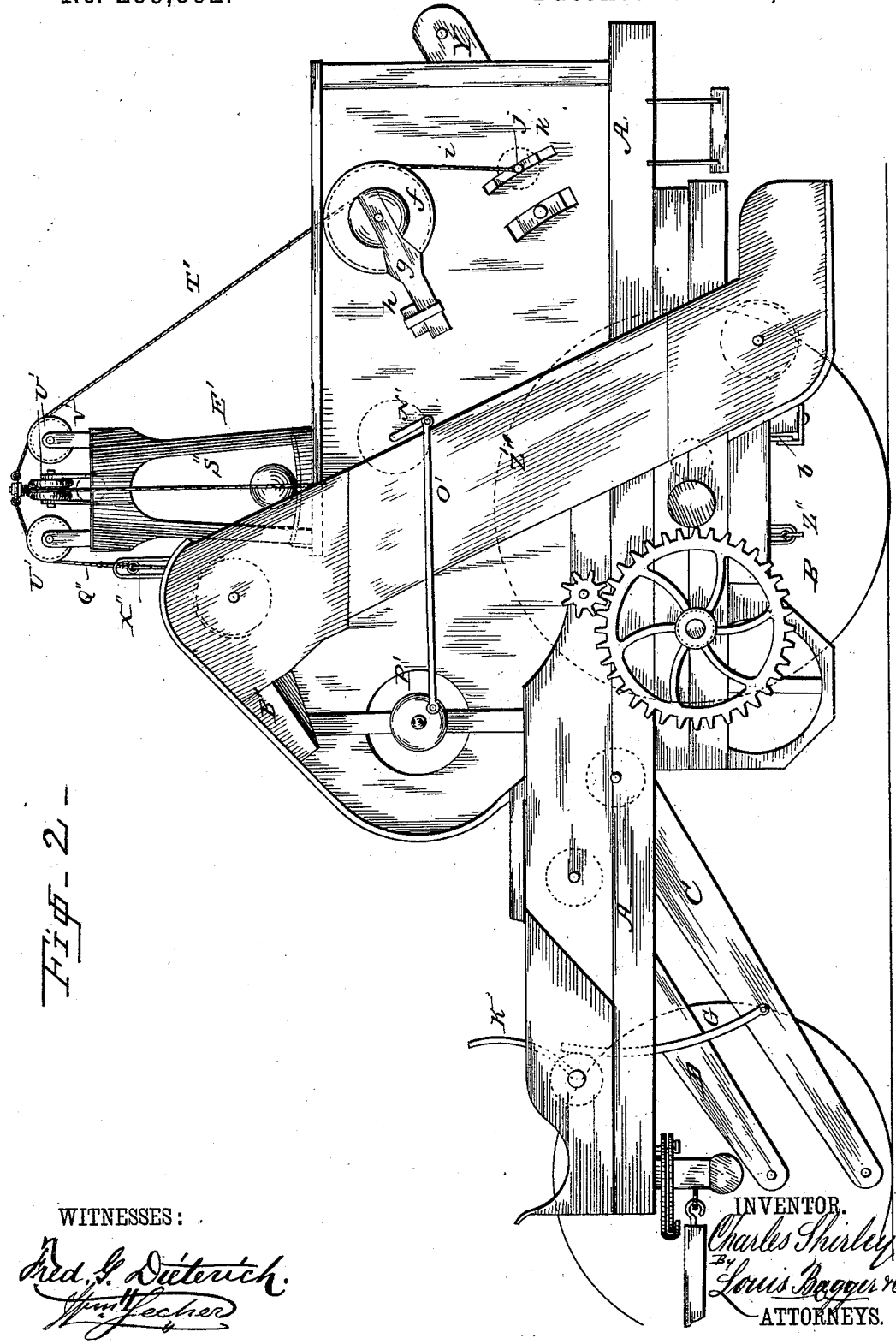

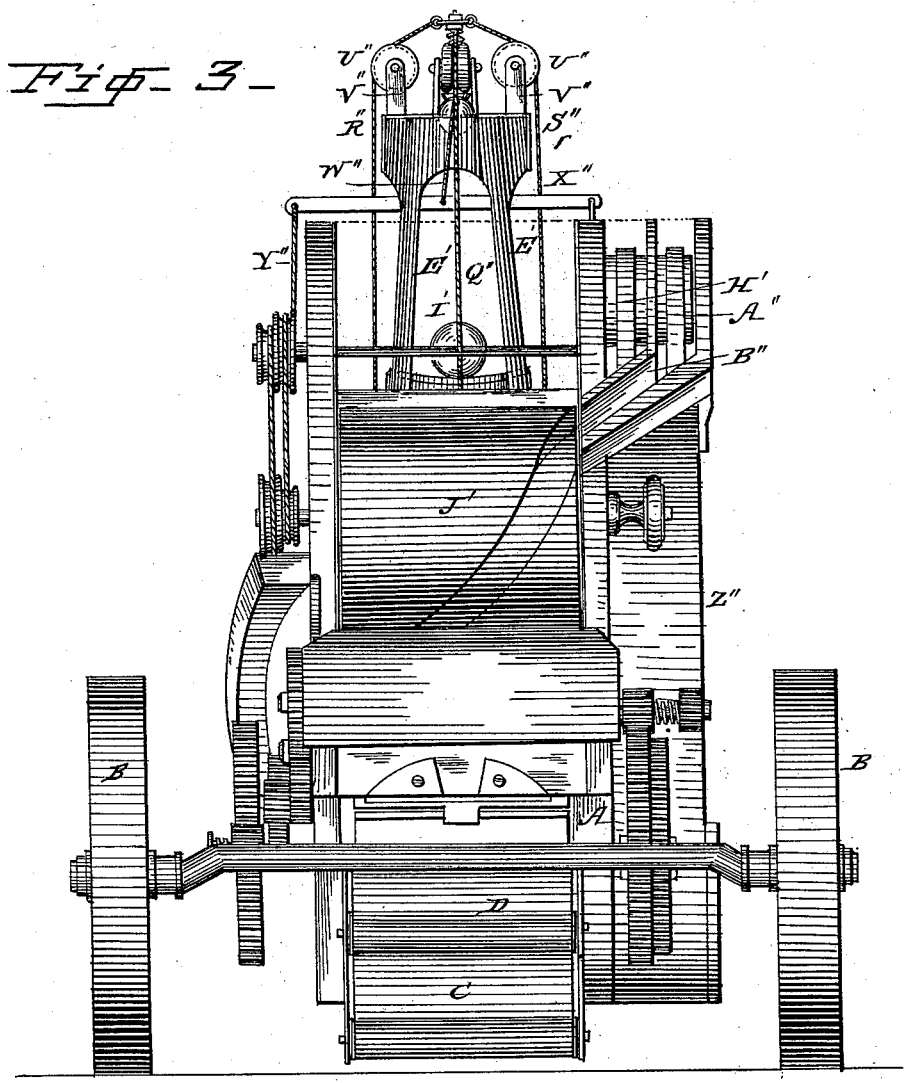

(No Model.) 8 Sheets—Sheet 5.
C. SHIRLEY.
THRASHING MACHINE.
No. 299,862. Patented June 3, 1884.
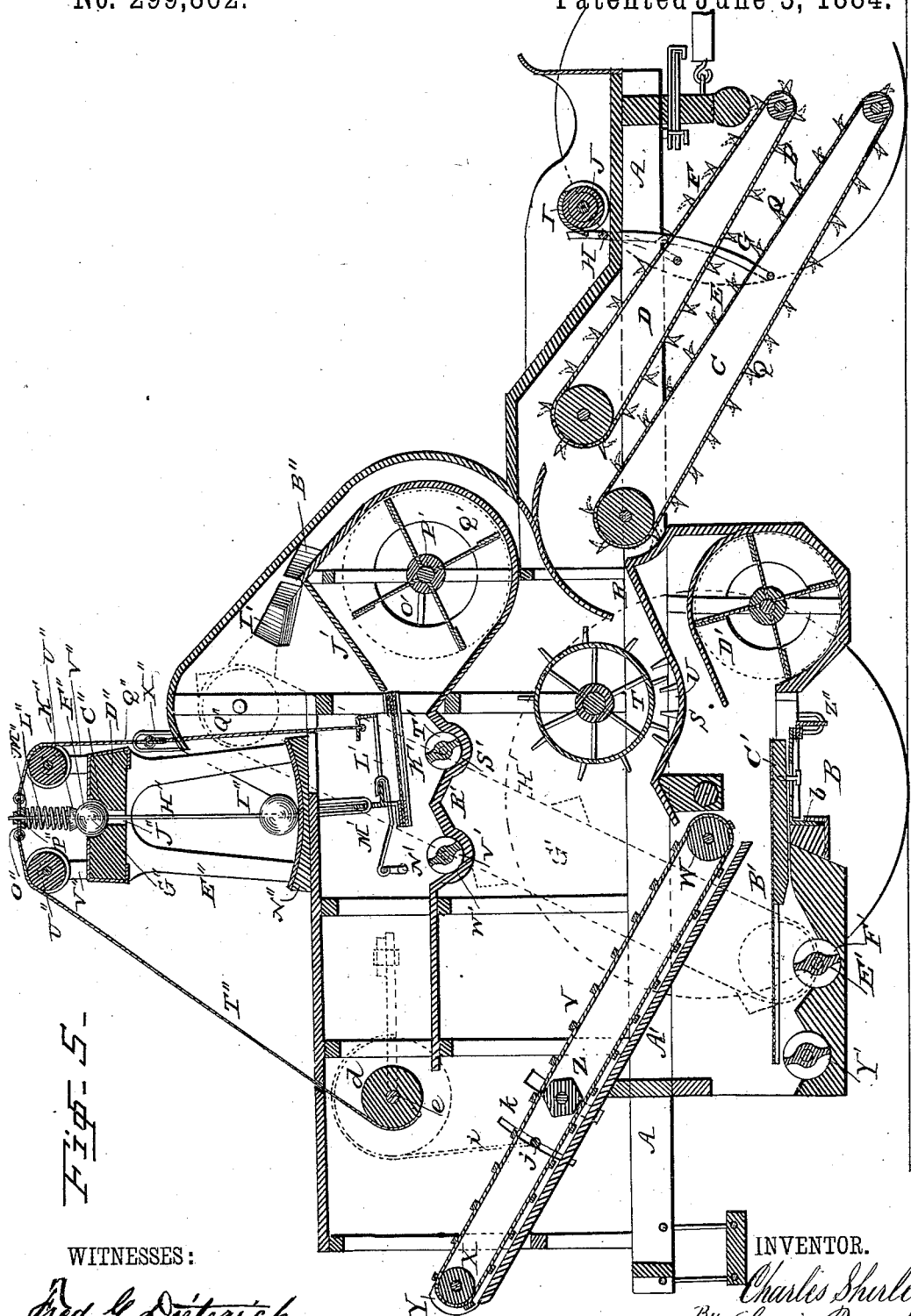
WITNESSES:
Fred G. Dieterich
INVENTOR.
Charles Shirley
By Louis Bagger
ATTORNEYS.

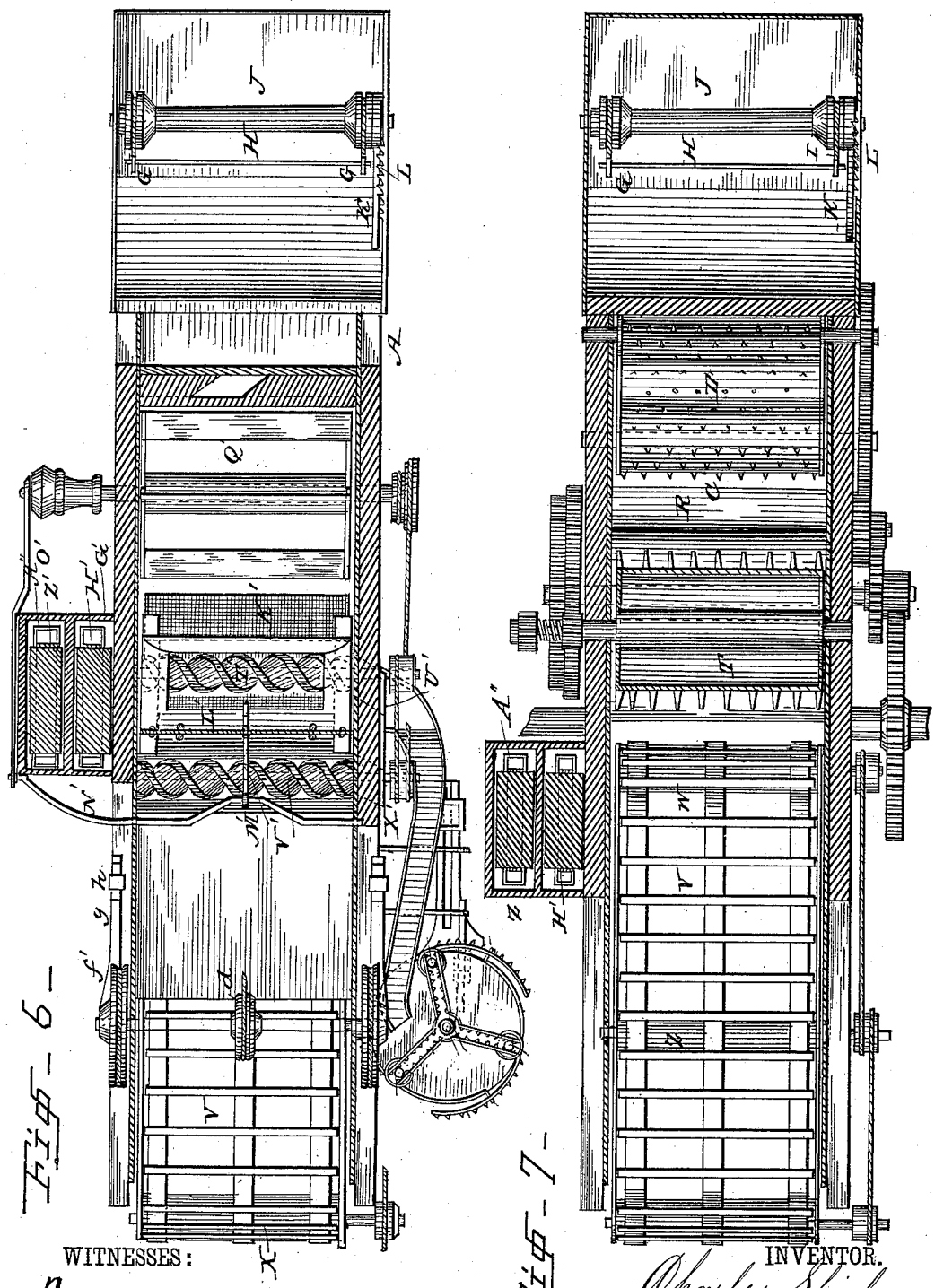

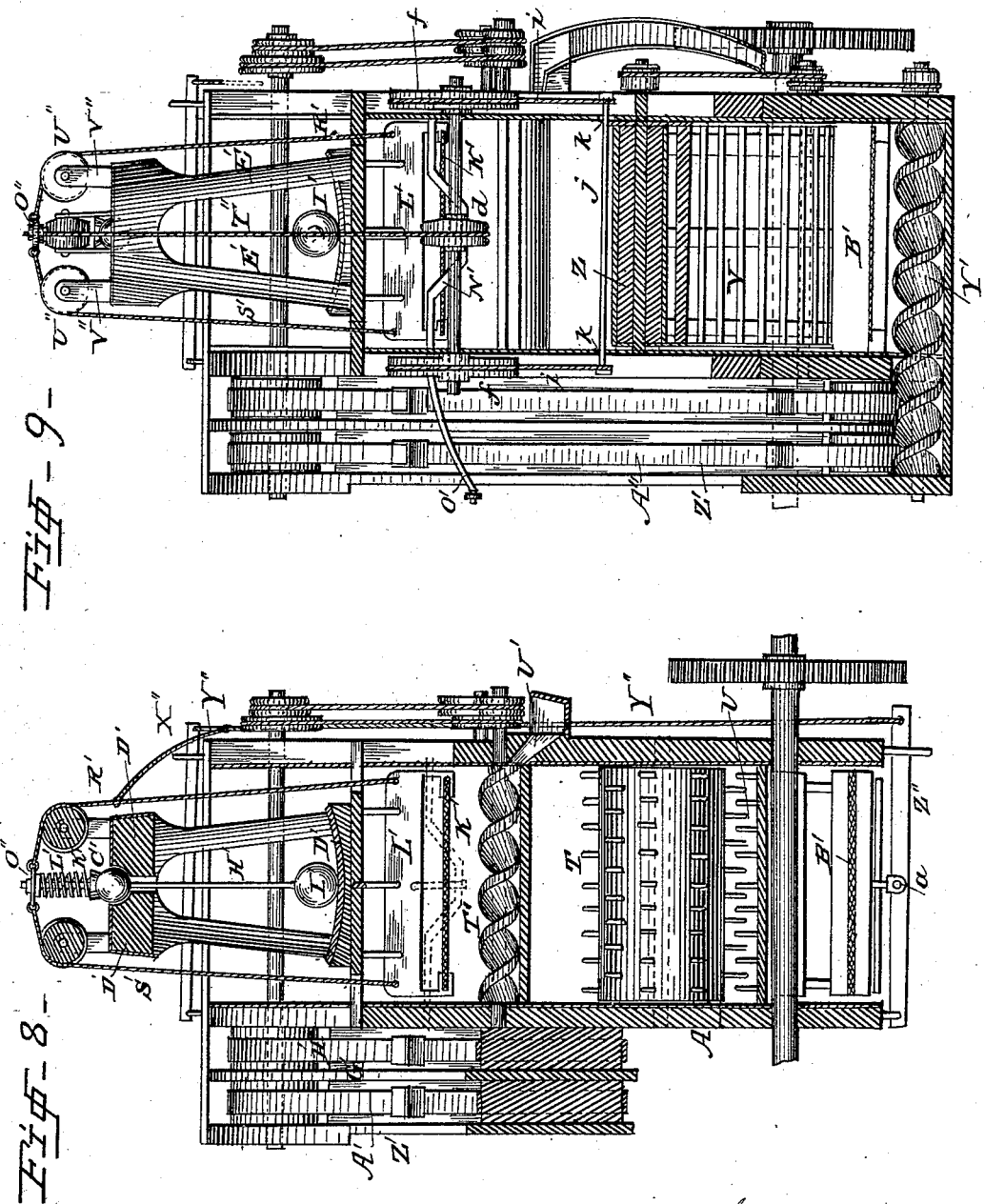

(No Model.)
8 Sheets—Sheet 8.
C. SHIRLEY.
THRASHING MACHINE.
No. 299,862. Patented June 3, 1884.
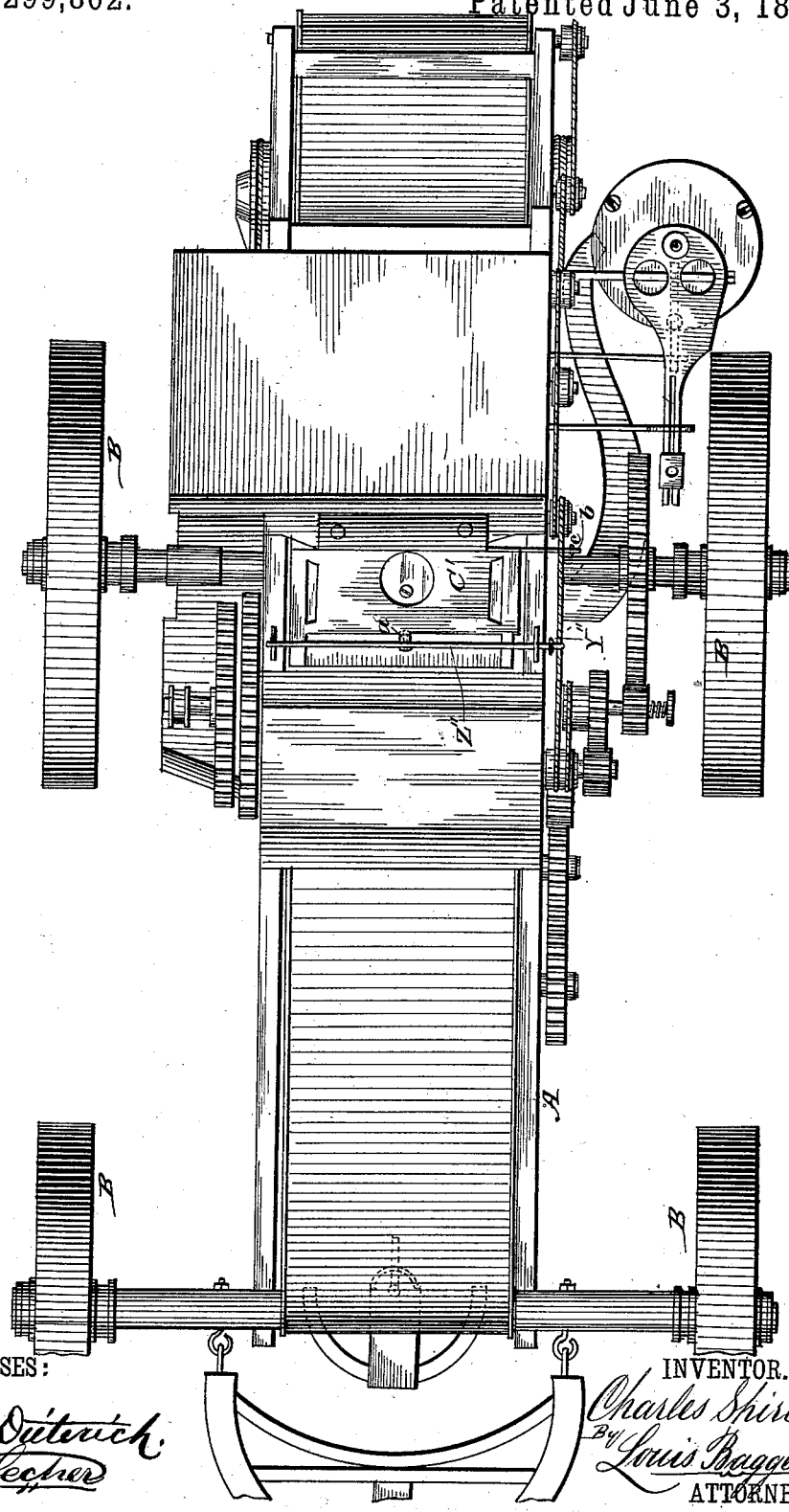
Fig- 10 -
WITNESSES:
INVENTOR.

UNITED STATES PATENT OFFICE.

CHARLES SHIRLEY, OF LUZERNE, IOWA.

THRASHING-MACHINE.

SPECIFICATION forming part of Letters Patent No. 299,862, dated June 3, 1884.

Application filed December 20, 1883. (No model.)

*To all whom it may concern:*

Be it known that I, CHARLES SHIRLEY, a citizen of the United States, and a resident of Luzerne, in the county of Benton and State of Iowa, have invented certain new and useful Improvements in Thrashing-Machines; and I do hereby declare that the following is a full, clear, and exact description of the invention, which will enable others skilled in the art to which it appertains to make and use the same, reference being had to the accompanying drawings, which form a part of this specification, and in which—

Figures 1 and 2 are side views of my improved thrashing-machine. Fig. 3 is a front view of the same with a portion of the casing removed. Fig. 4 is a rear view with a portion of the casing removed. Fig. 5 is a longitudinal vertical section. Figs. 6 and 7 are horizontal sections on lines $x\ x$ and $y\ y$, Fig. 1. Figs. 8 and 9 are cross-sections on lines $v\ v$ and $z\ z$, Fig. 1. Fig. 10 is a bottom view. Fig. 11 is a detail view of the device for leveling the screens.

Similar letters of reference indicate corresponding parts in all the figures.

My invention has relation to thrashing-machines adapted to gather the grain in the swath from the ground; and it consists in the improved construction and combination of parts of the same, as hereinafter more fully described and claimed.

In the accompanying drawings, the letter A indicates the frame of the machine, which is mounted on wheels B, and is adapted to be drawn along the swath of cut grain, straddling the same, and two elevators or carriers, C and D, having endless spiked belts E and F, are hinged in the front part of the frame, inclined toward the front, and are of sufficient width to carry the cut grain lying crosswise on the belts or aprons. The lower carrier, C, is provided with two upwardly-pointing curved arms, G, hinged upon the sides of its frame near its lower end, and the upper ends of these arms are connected by a cross-rod, H, after passing through the bottom of the frame, and have chains I attached to their ends, which chains wind upon a windlass, J, journaled across the forward end of the machine-frame, and having an arm, K, having a catch upon its side adapted to engage a series of ratchet-teeth, L, upon the inner side of the frame, and the carrier may be raised or lowered by means of this lever or arm by shifting it from one of the ratchet-teeth to another, the chains winding or unwinding upon the windlass. For the purpose of adjusting the space between the two carriers, an arm, M, having teeth upon one edge, and having a flange, N, upon the other edge, is hinged upon the side of the upper carrier, and slides with its lower end in a bail, O, upon the side of the lower carrier, the teeth upon the edge of the arm engaging the one end of the bail, and for the purpose of holding the teeth in engagement with the end of the bail a hook, P, is hinged near the bail upon the side of the lower carrier, and adapted to bear with the flanged outer side of its hooked end against the flanged edge of the arm, holding the same with its toothed edge against the end of the bail. The carriers are operated by suitable connection with the hind wheels, which act as drive-wheels, and the aprons, which are provided with flexible teeth Q, secured upon their outer sides, move upward, with their adjoining sides carrying the grain into a hopper, R, opening into the thrashing-cylinder S, in which the toothed cylinder T and the toothed concave U serve to thrash the grain. From the thrashing-cylinder the straw passes upward to the rear end of the machine upon an endless apron, V, traveling over a roller, W, journaled in the lower portion of the frame, and over a roller, X, journaled in the ends of two side pieces, Y, hinged at their lower inner ends upon the lower shaft of the straw-carrying apron, and a polygonous roller, Z, is journaled in the side pieces at their middle between the two sides of the apron, and is connected by pulley-and-belt connection to pulleys and belts upon the upper and lower roller-shafts, serving with its shape to shake the straw upon the apron, beating against its under side with its edges when revolved. An inclined bottom, A', is secured to the lower edges of the side pieces of the straw-carrier and serves to convey the grain shaken out of the straw down upon a screen, B', upon which the grain falling through the thrashing-concave is also conveyed, and which is reciprocated in a shoe, C', by suitable connection with the moving parts of the machine. A fan, D', journaled in front of the screen, serves to blow the chaff off the grain, which chaff is blown upon the lower end of the straw-carrier apron, which conveys it out at the rear end of the machine, while the partly-cleaned grain falls through the screen and is moved by means of a screw-conveyer, E', turning in a recess, F', in the bottom of the machine-casing, and revolved by suitable connection with the moving parts of the machine to the bottom of an elevator-casing, G', in which an endless elevator-belt, H', travels to the top of the machine, emptying the grain into a spout, I', which conveys the grain to an inclined board, J', upon which the grain slides down upon a screen, K', which slides in a shoe, L', and is reciprocated by means of a connecting-rod, M', which is hinged to the rear edge of the screen, and to a double crank upon the center of a shaft, N', which is rocked by means of a connecting-rod, O', hinged to a crank upon one end of the rocking crank-shaft, and to a crank-pin or eccentric-pin upon the shaft P' of a fan, Q', which is journaled in front of the screen, blowing the chaff from the grain upon the same out upon the upper end of the straw-carrier. The cleaned grain falling through the screen falls upon a floor, R', having a semi-cylindrical recess, S', in which a screw-conveyer, T', turns, operated by pulley-and-belt connection with the drive-shaft, which conveys the grain to a spout, U', at one side of the casing, which carries it to the bagging device, and a similar screw-conveyer, V', turning in a semi-cylindrical recess, W', in the floor to the rear of the other conveyer carries the tailings falling over the edge of the screen to a spout, X', at the side of the grain-spout, which allows them to drop down at the side of the machine, where a suitable receptacle may be arranged for collecting them, if desired. The broken-off and unthrashed heads which pass over the edge of the lower screen are moved by a screw-conveyer, Y', to the lower end of an elevator-casing, Z', which is secured upon the outside of the grain-elevator, where they are raised by an endless elevator-belt, A'', passing over pulleys at the upper and lower ends of the casing, which pulleys are secured upon the same shafts as the pulleys of the inner elevator and turned with them, which elevator-belt carries the heads to a spout, B'', at its upper end, which passes over the forward side of the casing of the upper fan, conveying the heads back to the thrashing-cylinder, where they are again thrashed.

A concave bearing or socket, C'', is formed in the upper surface of a plate, D'', mounted upon uprights E'' upon the top of the machine, and a ball, F'', rests in the said bearing, having a perforation, G'', passing through its center, in which perforation a rod, H'', having a ball or weight, I'', at its lower end, slides, the bearing having a central perforation, J'', through which the rod passes, the perforated ball resting and rocking upon the concave edges of the bearing. A washer, K'', bears against the upper side of the ball, fitting upon the rod, and a spiral spring, L'', bears with its lower end against this washer, while its upper end bears against the under side of a nut, M'', secured upon the upper end of the rod, and the said spring serves to raise the lower end of the rod and its ball from a concave plate, N'', secured upon the top of the machine-casing between the uprights, the upper side of which concave is covered with rubber, which serves to prevent jarring of the rod in case of the latter striking the concave when the machine is traveling over rough and uneven ground. A plate, O'', having a central perforation, P'', rests upon the upper side of the nut, fitting upon the top of the rod, and four cords or chains, Q'', R'', S'', and T'', are secured to the edges of the plate and pass over four pulleys, U'', journaled between upright lips V'' upon the top of the plate supported by the uprights, the said pulleys being at equal distances and arranged pointing straight forward, rearward, and to the two sides. The forward cord, Q'', passes downward after passing over the pulley, and is attached at its lower end to the forward end of the upper shoe, which is suspended from the end of this cord and from the ends of the two cords R'' and S'', which pass over the pulleys at the sides of the upright frame and are attached to the sides of the upper shoe, and it will be seen that in this manner the shoe will be kept level as the machine passes over the ground, the weighted pendulum always seeking the perpendicular, and consequently drawing or slacking the cords attached to its upper end, raising the side of the shoe nearest to the side to which the machine leans in passing over any unevenness upon the ground. A cord, W'', is attached to the upper portion of the forward cord, and is attached at its lower end to the center of a lever, X'', pivoted at one end upon the top of the machine-casing, and a cord, Y'', is attached to the free end of the said lever and passes down at one side of the casing, and is attached at its lower end to the free end of a lever, Z'', pivoted at its other end upon the bottom of the casing, and having a projecting pin upon its middle fitting into a socket, a upon the forward end of the lower shoe, which in this manner is pivoted and supported upon the same. A cross-bar, b, is secured to the under side of the lower shoe near its rearward end, and extends out at the right side of the machine, where a cord, c, is attached to its outer end, which cord passes up at the side of the casing, and is attached at its upper end to the cord R'', passing down at that side. It will thus be seen that as the machine leans forward or rearward or to one of the sides the forward cord will be tightened or slacked, raising or lowering the forward end of the shoe, and the cord passing down at the right side of the machine will be tightened or slackened, keeping the shoe suspended level. The rearward cord, T'', passes over a pulley, $d$, upon a shaft, $e$, journaled transversely in the machine-casing above the straw-carrier, and is attached to the same, and two pulleys or grooved segments, $f$, are secured upon the ends of the said shaft, and are provided with forwardly-extending lever-arms $g$, having sliding weights $h$ upon their ends. Two cords or chains, $i$, pass over these segments, and are secured to the upper portions of the same, and are secured at their lower ends to the ends of a cross-rod, $j$, secured to the straw-carrier, and sliding with its ends in segmental slots $k$ in the walls of the machine-casing, and it will be seen that as the machine is tilted forward or rearward in passing over unevenness in the ground the rearward cord is slackened or tightened, winding it upon or unwinding it from the pulley upon the middle of the transverse shaft, which again will unwind or wind the cords upon the segments, lowering or raising the rear end of the straw-carrier, the weights upon the arms of the transverse shaft counterbalancing the weight of the carrier, assisting in carrying the weight, which else would fall upon the upper end of the pendulum. The cleaned grain passes from the spout into bags supported by a device for bagging and weighing it, which will be made the subject of a separate application.

It will thus be seen that the machine will pass along the swath, thrashing the grain and leaving the straw and chaff in its place, cleaning and bagging the grain, and being adapted, by the manner of suspending the screens, to operate on rough ground as well as on smooth or level ground.

Having thus described my invention, I claim and desire to secure by Letters Patent of the United States—

1. In a thrashing-machine, the combination of the drive-wheels, the thrashing mechanism operated by the said wheels, means for conveying the cut grain from the swath to the thrashing-cylinder, and the straw-carrier and separating-shoes suspended so as to remain level without regard to the position of the machine, as and for the purpose shown and set forth.

2. In a thrashing-machine constructed with a thrashing-cylinder, means for conveying the grain from the swath to the thrashing-cylinder, carrying-wheels, and mechanism whereby said cylinder is operated from said wheels, the combination of a pendulum having a universal play, the straw-carrier and separator-shoes, and cords for suspending the said carrier and shoes within the machine-frame connected to the pendulum, the position of the pendulum regulating the position of the carrier and shoes, as and for the purpose shown and set forth.

3. The combination of an upright frame forming an annular concave socket or bearing, a weighted pendulum having a ball near its upper end rocking in the said bearing, vertical pulleys journaled upon the top of the frame, cords or chains attached to the upper end of the pendulum above the ball and passing over the pulleys, and a separator-shoe suspended from the ends of the said cords or chains, as and for the purpose shown and set forth.

4. The combination of an upright frame forming an annular concave socket or bearing at its upper end, a concave rubber-covered plate placed between the supports of the frame at their lower ends, a ball having a perforation passing through its center, a rod having a weight at its lower end and passing through the perforated ball, a washer resting upon the top of the perforated ball, a spiral spring wrapped around the upper end of the rod, a nut fitting upon the upper end of the rod and securing a perforated plate having eyes in its edges, pulleys journaled to turn in a vertical plane at the top of the upright frame, and cords or chains attached to the eyed plate upon the upper end of the rod and supporting the separator-shoes at their lower ends, as and for the purpose shown and set forth.

5. The combination of a pendulum suspended at the upper end of an upright frame, a cord or chain attached to the upper end of the pendulum above the point of suspension and passing over a suitable guide-pulley, a shaft journaled transversely in the machine-casing above the straw-carrier, and having a pulley at its middle, to which the end of the cord or chain is attached, and upon which it winds, two pulleys or segments secured upon the ends of the transverse shaft, and having forwardly-projecting levers provided with sliding poises, a straw-carrier hinged at its inner end, and cords or chains secured to and winding upon the pulleys or segments, and secured at their lower ends to a cross-bar upon the straw-carrier, as and for the purpose shown and set forth.

6. In a machine for taking the cut grain from the swath and thrashing it, the combination of the conveyers hinged at their upper ends, means for raising and lowering the lower conveyer, an arm hinged upon the side of the upper conveyer, having a notched and flanged edge, a bail secured upon the side of the lower conveyer, and a hook pivoted upon the side of the lower conveyer and having the outer side of its hooked end flanged, as and for the purpose shown and set forth.

7. The combination of two conveyer-frames hinged at their upper ends and inclined forwardly, means for adjusting them relatively to each other, means for raising and lowering them, the endless conveyer-aprons having flexible teeth upon their faces, and means for revolving the aprons with their facing portions in an upward direction, as and for the purpose shown and set forth.

8. The combination of the thrashing-cylinder and concave, the straw-carrier having the inclined bottom, the lower separating-shoe, the lower fan, the lower grain-conveyer, the lower head-conveyer, the double elevator having the lower end of the inner elevator opening into the grain-conveyer, and the lower end of the outer elevator opening into the head-conveyer, the grain-spout opening from the upper end of the inner elevator down to the upper separating-shoe, the head-conveying spout opening into the thrashing-cylinder from the upper end of the outer elevator, the upper cleaning-shoe, the upper fan, the grain-conveyer, the grain-spout, the tailings-conveyer, and the tailings-spout, all constructed and arranged as and for the purpose shown and set forth.

9. The combination of the lower separating-shoe having a socket or bearing upon the middle of its lower rear edge, the lever pivoted at its one end upon the bottom of the machine-casing, and having a bolt at its middle fitting and turning in the socket upon the shoe, a bar secured transversely upon the bottom of the shoe and pivoted at its center upon a pin upon the bottom of the machine-casing, a pendulum suspended upon the top of the machine by a universal joint, and cords or chains passing over suitable pulleys attached to the upper end of the pendulum above the point of suspension, and attached at their lower ends to the free end of the lever and to one end of the transverse bar, respectively, as and for the purpose shown and set forth.

In testimony that I claim the foregoing as my own I have hereunto affixed my signature in presence of two witnesses.

CHARLES SHIRLEY.

Witnesses:
A. F. BELL,
ANDREW HALE.